US007054322B2

(12) United States Patent
D'Annunzio et al.

(10) Patent No.: US 7,054,322 B2
(45) Date of Patent: May 30, 2006

(54) MOBILE COMMUNICATIONS NETWORK USING POINT-TO-POINT PROTOCOL OVER ETHERNET

(75) Inventors: Michael A. D'Annunzio, Redmond, WA (US); Vincent D. Skahan, Jr., Federal Way, WA (US); Eugene E. Devereaux, Lakewood, WA (US)

(73) Assignee: The Boeing Company, Chicago, IL (US)

( * ) Notice: Subject to any disclaimer, the term of this patent is extended or adjusted under 35 U.S.C. 154(b) by 1049 days.

(21) Appl. No.: 09/945,352

(22) Filed: Aug. 31, 2001

(65) Prior Publication Data

US 2003/0048766 A1    Mar. 13, 2003

(51) Int. Cl.
*H04L 12/56* (2006.01)
(52) U.S. Cl. .................. 370/401; 370/389; 370/392
(58) Field of Classification Search ............... None
See application file for complete search history.

(56) References Cited

U.S. PATENT DOCUMENTS

| | | | |
|---|---|---|---|
| 5,794,250 A | 8/1998 | Carino, Jr. et al. | |
| 5,850,517 A | 12/1998 | Verkler et al. | |
| 6,182,144 B1 | 1/2001 | England | |
| 6,757,712 B1 * | 6/2004 | Bastian et al. | 709/206 |
| 6,760,757 B1 * | 7/2004 | Lundberg et al. | 709/217 |
| 6,763,012 B1 * | 7/2004 | Lord et al. | 370/338 |

2002/0152468 A1    10/2002 Parkman

OTHER PUBLICATIONS

Mamakos et al., RFC 2516: A Method for Transmitting PPP Over Ethernet (PPPoE), Feb. 1999, The Internet Society, pp. 1-2.*
Rekhter et al., RFC 1918: Address Allocation for Private Internets, Feb. 1996, The Internet Society, pp. 1-2.*
Kent & Atkinson, RFC 2401: Security Architecture for the Internet Protocol, Nov. 1998, The Internet Society, p. 3.*

* cited by examiner

*Primary Examiner*—Chi Pham
*Assistant Examiner*—Jordan Hamann
(74) *Attorney, Agent, or Firm*—Harness, Dickey & Pierce P.L.C.

(57) ABSTRACT

A communications system that provides broadband access to passengers of mobile platforms includes a router located on the mobile platform. A network is connected to the router. User communication devices (UCDs) connected to the network, wherein the UCDs establish point-to-point over Ethernet (PPPoE) sessions with the router. A transmitter and a receiver are connected to the router. A satellite and a ground station are in communication with the transmitter and the receiver. A distributed communications system includes virtual private networks (VPN) and is connected to the ground station. A first address manager leases the use of public IP addresses by the mobile platform. A second address manager assigns the public IP addresses to UCDs when the UCDs request access to the VPNs and private IP addresses for other network service. The UCDs employ IPSec protocol when accessing the VPNs.

28 Claims, 6 Drawing Sheets

MOBILE COMMUNICATIONS NETWORK USING POINT-TO-POINT PROTOCOL OVER ETHERNET

FIELD OF THE INVENTION

The present invention relates to broadband communications systems for mobile platforms, and more particularly to a broadband communication system employing point protocol over Ethernet (PPPoE).

BACKGROUND OF THE INVENTION

Broadband communications access, on which our society and economy is growing increasingly dependent, is not readily available to users on board mobile platforms such as aircraft, ships, and trains. While the technology exists to deliver the broadband communications services to mobile platforms, conventional solutions are commercially unfeasible due to the high costs for service or due to low data rates. The conventional solutions have typically only been available to government/military users and/or to high-end maritime markets such as cruise ships.

Passengers of aircraft are often business users who require access to their corporate network. To attract business users, the broadband communication services must provide acceptable data rates at a reasonable price and allow access to virtual private networks (VPNs). There are two basic modes of operation of VPNs. In a first mode, the VPN provides secure remote access from the client to corporate gateway across the Internet. In a second mode, the VPN provides secure gateway to gateway connections across the Internet. The first mode of operation applies when a passenger's laptop runs VPN client software and communicates with the passenger's corporate VPN gateway.

There are many different security protocols that are currently being used on the Internet. Layer 2 Forwarding (L2F) is a security protocol created by Cisco Systems. Point-to-Point Tunneling Protocol (PPTP), created by the PPTP industry forum, is currently the most widely used VPN protocol. There are several security weaknesses that make PPTP undesirable for future use. Layer 2 Tunneling Protocol (L2TP) evolved through the IETF standards process and is a security protocol that is a combination of PPTP and L2F. Internet protocol security (IPSec) is an architecture and related Internet key exchange (IKE) protocol that is described by IETF RFCs 2401–2409, which are hereby incorporated by reference. IPSec provides robust security and is a preferred protocol for future use.

IPSec provides integrity protection, authentication, privacy and replay protection services for IP level traffic. IPSec packets are of two types. A first type, IP protocol 50 (Encapsulated Security Payload (ESP)), provides privacy, authenticity and integrity. A second type, IP protocol 51 (Authentication Header (AH) format), provides integrity and authenticity for packets but not privacy.

IPSec can be used in two modes. A transport mode secures an existing IP packet from source to destination. A tunneling mode puts an existing IP packet inside a new IP packet that is sent to a tunnel end point in the IPSec format. Both transport and tunnel modes can be encapsulated in ESP or AH headers.

Internet web sites are identified by a public address. Routers and switches use the public address to route IP packets. Public addresses are considered a scarce resource. Requests for public address space from American Registry for Internet Numbers (ARIN) are scrutinized for efficient usage. Permanently assigning even a small number of public addresses to each mobile platform requires a large number of public addresses. When the mobile platform is not in use, the address(es) allocated to the mobile platform are not used. If a significant percentage of mobile platforms are not in use at a given time, ARIN will conclude that the public addresses are inefficiently used and deny the request.

To efficiently use IP addresses, some broadband communications systems employ Network Address Translation (NAT). NAT allows many hosts to share a single IP address by multiplexing streams based on transmission control protocol/user datagram protocol (TCP/UDP) port numbers as well as IP addresses. NAT was developed as an interim solution to combat IP address depletion. NAT maps IP addresses from one address domain to another, most often by mapping private IP addresses to public IP addresses. In a static NAT, a one-to-one mapping is defined between public and private IP addresses. In a dynamic NAT, a pool of public IP addresses is shared by an entire private IP subnet.

For example, private hosts 192.168.0.1 and 192.168.0.2 both send packets from source port 2000. A NAT device translates these to a single public IP address 207.29.194.28 with two different source ports, for example 2998 and 2999. Response traffic that is received for port 2998 is readdressed and routed to 192.168.0.1. Response traffic that is received for port 2999 is readdressed and routed to 192.168.0.2. As can be appreciated, the NAT gateway is directional.

When IPSec systems employ AH, the entire IP packet including invariant header fields (like source and destination address) is run through a message digest algorithm to produce a keyed hash. The recipient uses the keyed hash to authenticate the IP packet. If any field in the original IP packet is modified, authentication will fail and the recipient will discard the IP packet. AH is intended to prevent unauthorized modification, source spoofing, and man-in-the-middle attacks. NAT, however, by definition modifies IP packets. NAT modifies the packet header by replacing the packet's source address. As a result, systems employing NAT cannot employ IPSec if the remote system is configured to employ AH or gateway.

Therefore, a broadband communications system for mobile platforms that allows users to access VPNs, that conserves IP address space, that provides sufficiently high data rates and/or that conforms with the IPSec protocol would be desirable.

SUMMARY OF THE INVENTION

A communications system according to the invention for providing broadband access to passengers of mobile platforms includes a router located on the mobile platform. A network is connected to the router. User communication devices (UCDs) connected to the network, wherein the UCDs establish point-to-point over Ethernet (PPPoE) sessions with the router.

In other features of the invention, a transmitter on the mobile platform is connected to the router. A receiver on the mobile platform is connected to the router. A satellite is in communication with the transmitter and the receiver of the mobile platform. A ground station is in communication with the satellite. A distributed communications system is connected to the ground station. A virtual private network (VPN) is connected to the distributed communications system.

In still other features of the invention, a first address manager is connected to the ground station. The first address manager leases use of public Internet Protocol (IP) addresses by the mobile platform. The router includes a second address manager that communicates with the first address manager to lease the public IP addresses for the mobile platform. The second address manager assigns the public IP addresses when the UCDs request access to the VPN. The second address manager assigns private IP addresses to the UCDs for at least one network service provided by the mobile platform.

In still other features of the invention, the UCDs employ IPSec security protocol when communicating with the VPN.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention provides a broadband communications system for mobile platforms that allows users to access VPNs, that conserves IP address space and that conforms with the IPSec protocol. When users located on the mobile platform initially request access, the communications system assigns a private address. When the user requests access to a VPN, the communications system assigns a public address to the user from a pool of public addresses that are preferably leased. Switching from the private address to the public address is performed without requiring the user to reboot. Access to other resources such as non-VPN web sites and multimedia services are preferably prevented while the user is assigned the public address to optimize the use of the public address pool. When the user finishes using the VPN, the public address is returned to the pool and the user is reassigned a private address. The reassignment to a private address is also preferably performed without rebooting the user's computer. When accessing a VPN site that employs IPSec with AH, proper authentication is performed and the IP packets are not discarded. Furthermore, the use of public IP address space is conserved in accordance with IANA requirements.

Figure 1:
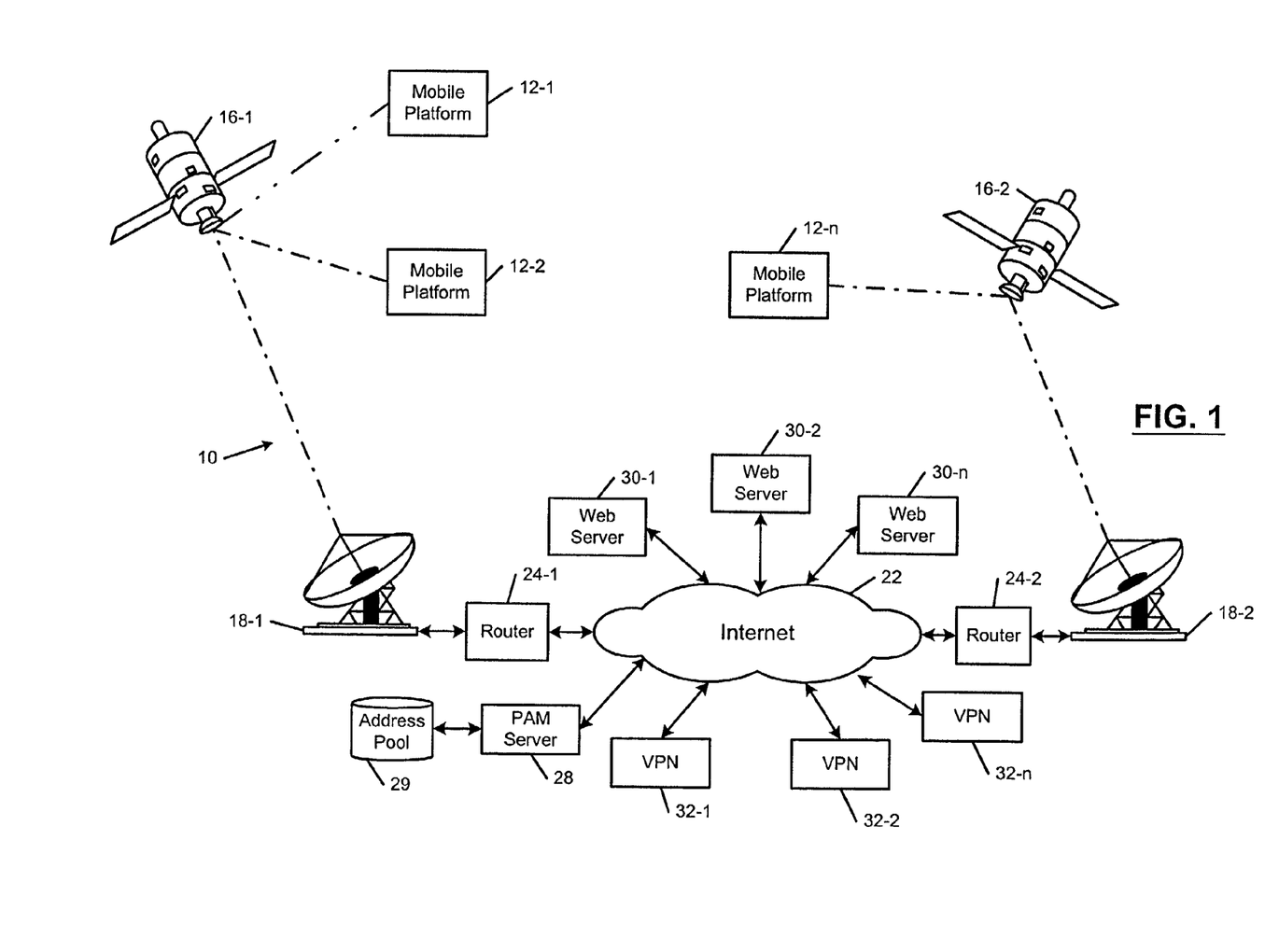
FIG. 1 is a functional block diagram illustrating a broadband communications system including mobile platforms, satellites, ground stations and the Internet.

Referring now to FIG. 1, a mobile platform communications system 10 for mobile platforms 12-1, 12-2, . . . , 12-n is shown. The mobile platforms 12 communicate via one or more satellites 16-1, 16-2, . . . , 16-n and with one or more ground-based receiving stations 18-1, 18-2, . . . , 18-n. The ground-based receiving stations 18 are connected to a distributed communications system 22 via a router 24-1, 24-2, . . . , 24-n. A public address manager (PAM) server 28 is connected to the distributed communications system 22, the router 24 or to the ground-based receiving stations 18. The PAM server 28 manages the leasing of public addresses that are stored in a public address pool 29 to the mobile platforms 12 as will be described more fully below.

One or more web servers 30-1, 30-2, . . . , 30-n are connected to the distributed communications system 22. Likewise, one or more virtual private networks (VPNs) 32-1, 32-2, . . . , 32-n are connected to the distributed communications system 22. The distributed communications system 22 is preferably the Internet. Users located on the mobile platform 12 access the web servers 30 and/or the VPN's 32 via the mobile platform communications system 10. As can be appreciated, the mobile platform establishes an air-to-ground network via the satellites 16 and the ground stations 18.

Figure 2:
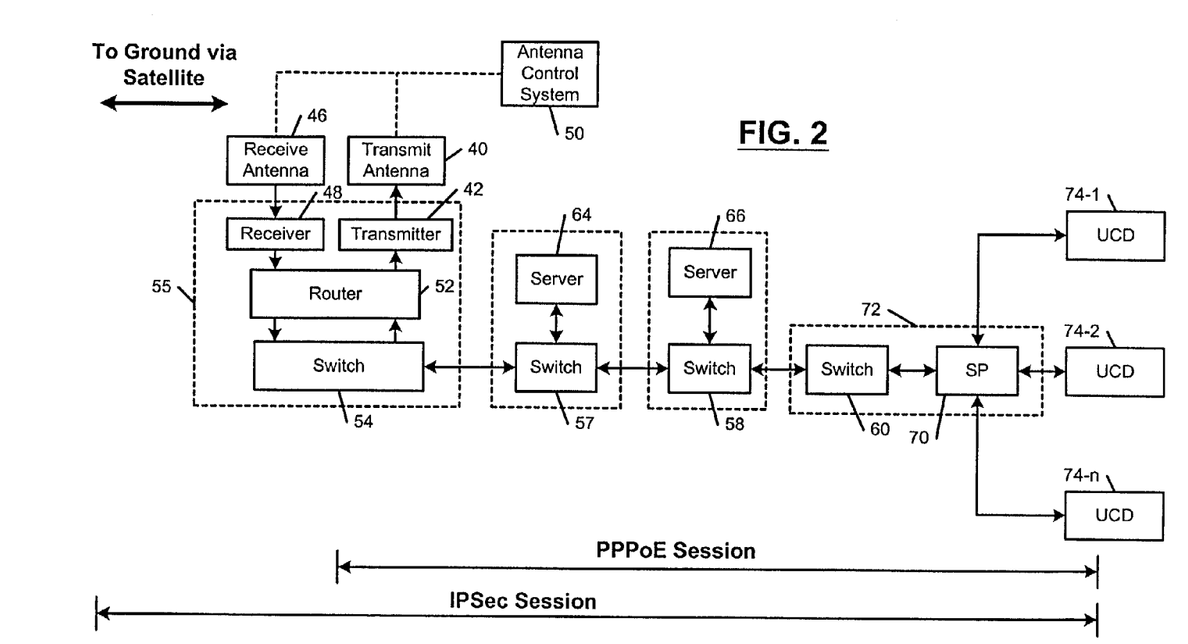
FIG. 2 is a functional block diagram illustrating the mobile platform communications system that employs a Point-to-Point over Ethernet (PPoE) protocol on the mobile platform.
Figure 3:
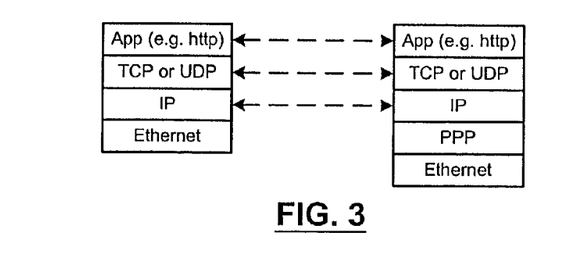
FIG. 3 illustrates the protocols employed by the ground-based distributed communications system and by the mobile platform communications system.

Referring now to FIGS. 2 and 3, the mobile platform 12 includes a transmit antenna 40 that is connected to a transmitter 42 and a receive antenna 46 that is connected to a receiver 48. The transmit and receive antennas 40 and 46 are controlled by antenna control system 50 in a conventional manner. The receiver 48, transmitter 42, the router 52 and the switch 54 are collectively referred to as a data transceiver router (DTR) 55. The transmit and receive antennas 40 and 46 are connected to a router 52 and a switch 54.

The switch 54 is connected to one or more switches 57, 58, and 60. The switches 57 and 58 are connected to servers 64 and 66. The servers 64 and 66 provide web services, an aircraft interface unit (AIU), flight specific websites such as car rental companies located at the destination, popular web sites such as CNN, MSN, etc. that are stored in cache, targeted advertising, and other content. The switch 60 is connected to one or more seat processors 70 that are connected to one or more user communication devices UCD 74-1, 74-2, . . . , 74-n. The switch 60 and seat processor 70 are collectively referred to as a seat electronic box 72. The UCD 74 is a laptop computer, a personal digital assistant PDA, or any other electronic device that communicates via the Internet. The UCDs 74 preferably include a microprocessor, memory (such as random access memory, read-only memory, and/or flash memory), and input/output devices such as a keyboard, a mouse, and/or a voice operated interface. The mobile platform communication system 10 establishes a PPPoE session between the UCD 74 and the DTR 55. From the viewpoint of the distributed communications system, the protocols employed by the mobile platform communication system 10 are transparent as can be seen in FIG. 3.

Figure 4:
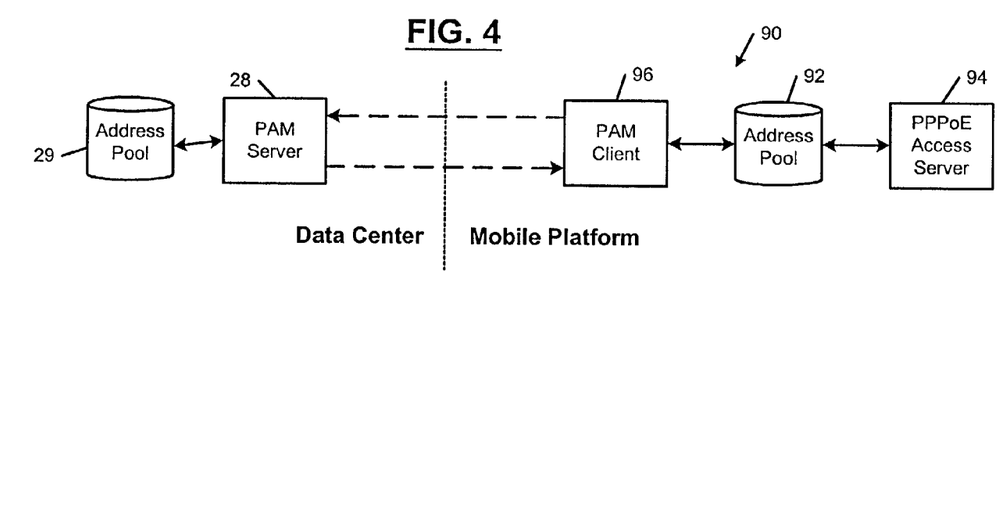
FIG. 4 illustrates an address manager.

Referring now to FIG. 4, the DTR 55, the server 64 or the server 66 preferably include an address manager 90 including an address pool 92, an access server 94 and a PAM client 96. The PAM client 96 requests address blocks from the PAM server 28 based on need. The PAM client 96 also transmits periodic lease maintenance messages to the PAM server 28 to maintain the leases on the address block(s). The address pool 92 stores the address blocks and the PPPoE Access Server 94 controls the use of the public addresses by the UCDs 74.

Figure 5:
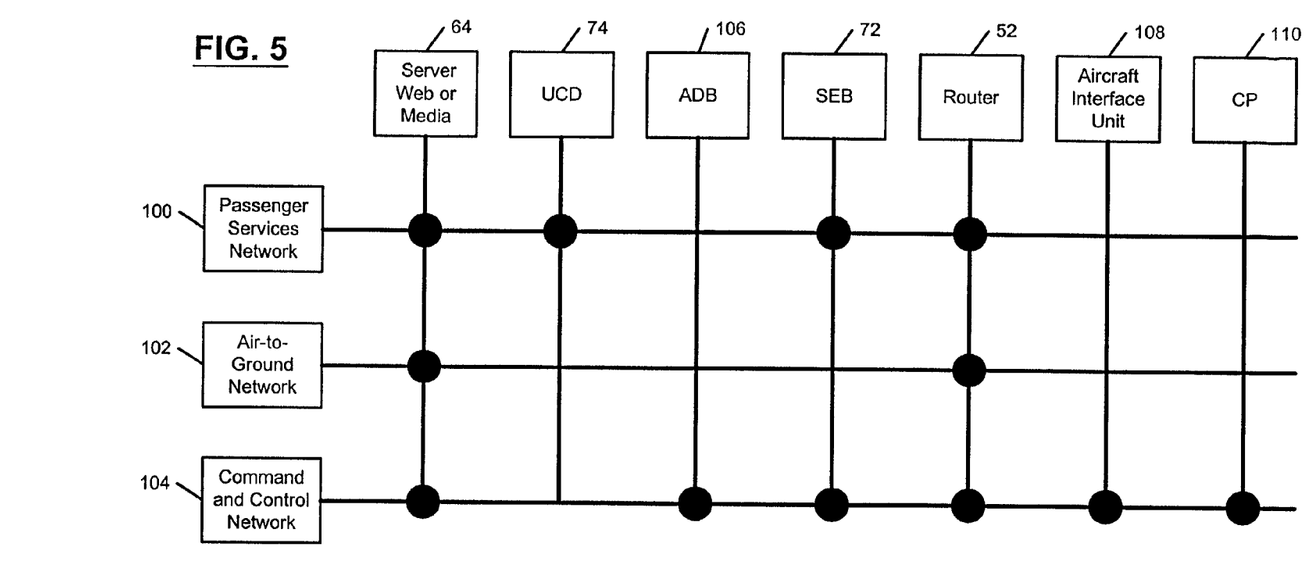
FIG. 5 illustrates the connectivity between a passenger services network, an air-to-ground network and a command and control network.

Referring now to FIG. 5, there are three or more logical subnets: a passenger services network 100, an air-to-ground network 102 and a command and control network 104. For example, the servers 64 and 66 that provide web or media services are multi-homed in that they have multiple physical interfaces. The UCDs 74 are connected to the passenger services network 100. IP aliasing allows multiple IP addresses to be configured on the same physical interface. The IP addresses can be from the same or different subnets. Multiple logical subnets can be created on the same physical network. Since only a router can forward traffic between subnets, logical subnets simplify router and host-based packet filtering to control inter-subnet access. Logical subnets allow access to actual application ports to be restricted to specific subnets. Logical subnets allow maximum uses of private address ranges and reuse of address ranges between module platforms. Logical subnets minimize the number of subnets that must be advertised to the ground.

The command and control network 104 is an onboard network that supports local command and control functions such as configuration, initialization, data load, and other similar functions. None of the UCD 74 are assigned addresses from the address range of the command and control network 104. In a preferred embodiment, the command and control network 104 uses a class B private address range that is reused on each aircraft, for example 172.16.0.0/16. Devices that are attached to the command and control network 104 do not communicate directly to the ground using addresses for the command and control network 104. The command and control network 104 subnet is not advertised to the ground. Command and control addresses are not altered using NAT.

The air-to-ground network 102 includes devices that need to communicate directly with the ground. These devices are assigned addresses from the air-to-ground network 102 address range. The air-to-ground network 102 is the only subnet that is advertised to the ground as reachable from the aircraft. The air-to-ground network 102 address range is not reused. The air-to-ground network 102 addresses uniquely identify each airborne network. Preferably, the air-to-ground network 102 uses a private class A subnet, for example 10.0.0.0/8 with subnetting to uniquely identify each airborne network.

The passenger services network 100 is a network that provides direct services to UCDs 74 that are assigned addresses from the passenger services network 100. The servers 64 and 66, the airborne router 52, and the SEB 72 are assigned addresses from the passenger services network 100. The passenger services network preferably employs a class B private address range, for example 172.17.0.0/16. The address range is reused on each aircraft. Addresses from the passenger services network 100 are translated into an AGN address by a NAT function in the DTR 55 for offboard access.

Figure 6:
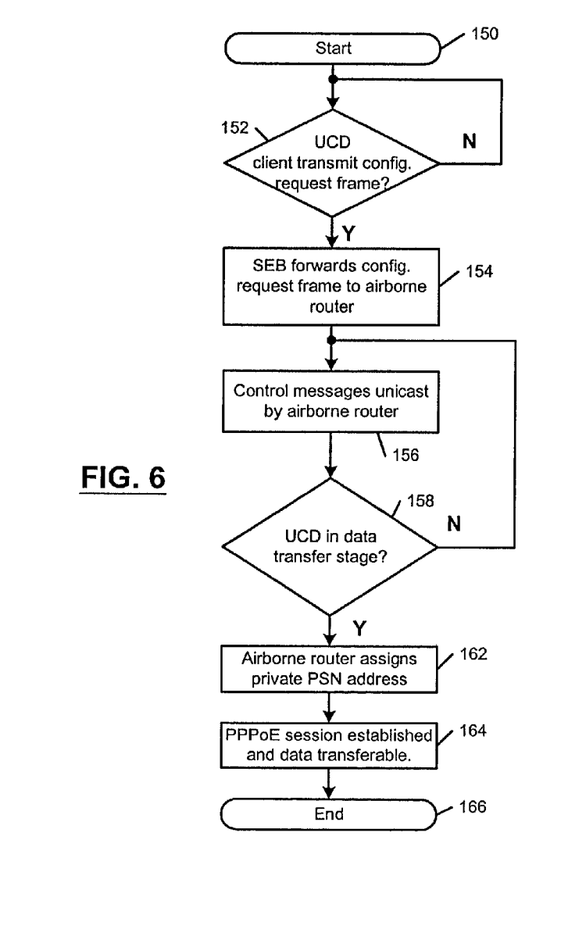
FIG. 6 illustrates steps for initiating a PPPoE session by a user communication device (UCD) on the mobile platform.

Referring now to FIG. 6, steps for initiating communications by the UCD 74 are illustrated. Control begins with step 150. In step 152, control determines whether the UCD 74 transmits a configuration request frame. If not, control loops back to step 152. The configuration request frame is a broadcast Ethernet frame that employs PPPoE control type code. If the configuration request frame is sent, the SEB 72 and/or the seat processor 70 forwards the configuration request frame to the router 52 in step 154. In step 156, control messages are unicast by the router 52. In step 158, control determines whether the client is in the data transfer stage. If not, control loops back to step 156. Otherwise, control continues with step 162 where the router 52 assigns a private address to the client. In step 164, a PPPoE session is established and data transfer is enabled. Control ends at step 166.

Figure 7:
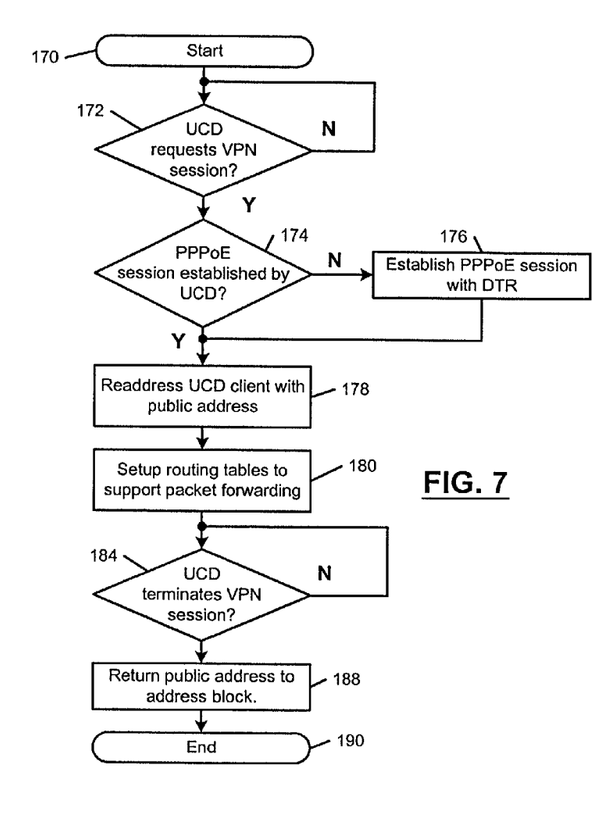
FIG. 7 illustrates steps employed by the mobile platform for assigning public addresses to allow the UCD to access a VPN.

Referring now to FIG. 7, steps for establishing a VPN session are shown. Control begins with step 170. In step 172, control determines whether one of the UCDs 74 has requested the VPN session. If not, control loops to step 172. If the UCD 74 has requested a VPN session, control determines whether a PPPoE session has been established by the UCD 74 requesting VPN access in step 174. If not, a PPPoE session is established between the router 52 and the requesting UCD 74 in step 176 (by executing steps 150–166). Control continues from steps 174 and 176 to step 178 where the UCD 74 is reassigned the public address from the public address block. In step 180, the routing tables are set up to support packet forwarding. In step 184, control determines whether the UCD 74 terminated the VPN session. If not, control loops back to step 184. If the VPN session has been terminated, control continues with step 188. The public address is returned to the public address block in step 188. Control ends with step 190.

Figure 8:
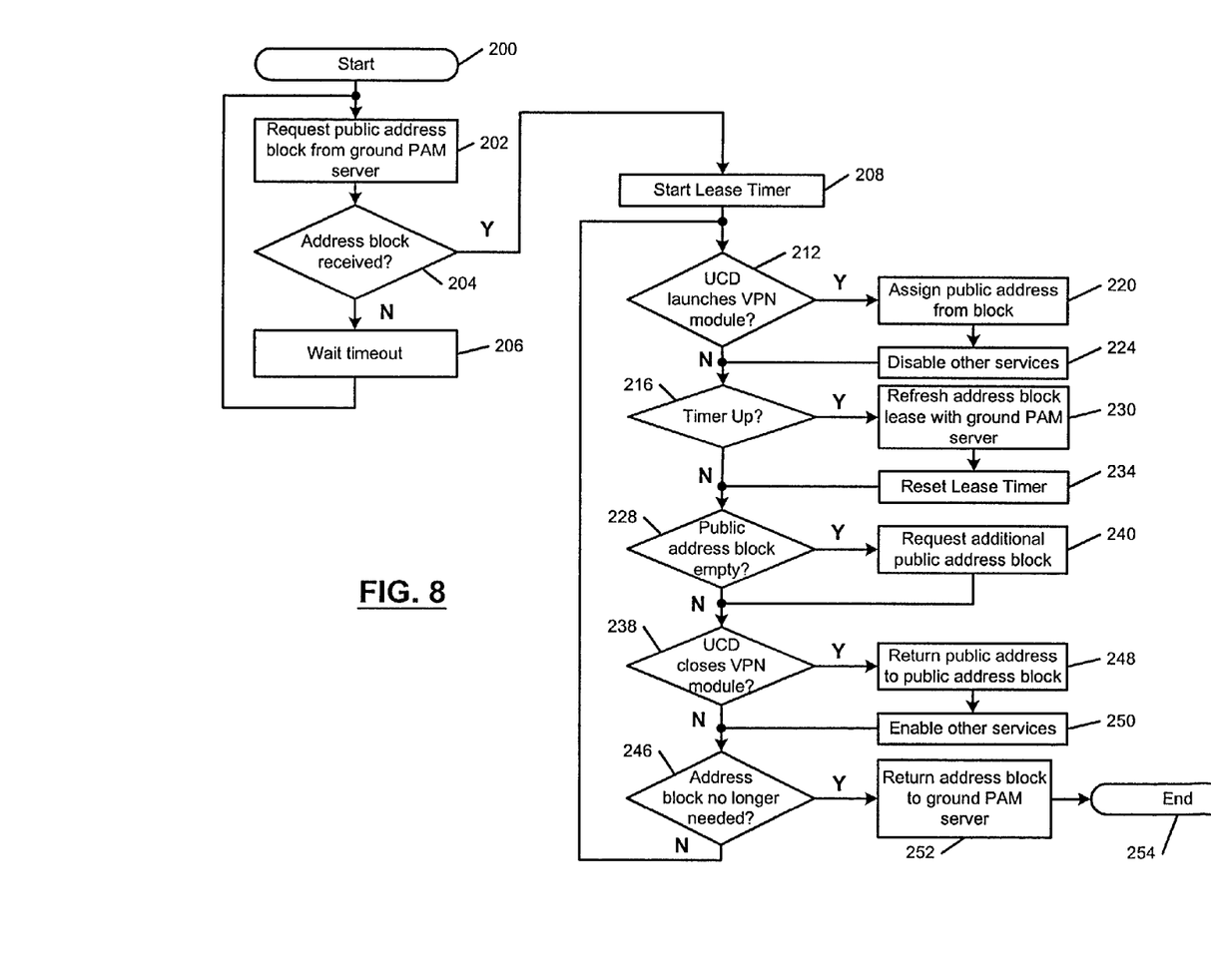
FIG. 8 illustrates steps employed by the mobile platform for leasing public address blocks from a public address manager server and for assigning the public address to UCDs.

FIG. 8 illustrates steps performed by the PAM client on the mobile platform to provide public addresses to the UCDs 74 for use with VPNs. Control begins with step 200. In step 202, the PAM client 96 requests a public address block from the ground PAM server 28. In step 204, control determines whether the public address block has been received. If not, control waits for the timeout period in step 206 and then continues with step 202. If the public address block has been received, control continues with step 208 where a lease timer is reset. In step 212, control determines whether the UCD 74 has launched the VPN module. If not, control continues with step 216. Otherwise, control assigns a public address from the public address block in step 220. In step 224, control optionally disables other services such as access to non-VPN web sites or other multimedia services and continues with step 216. The other services are optionally disabled to optimize the use of the public addresses.

In step 216, control determines whether the lease timer has timed out. If not, control continues with step 228. If the lease timer has timed out, control continues with step 230 where the PAM client 96 refreshes the public address block lease with the ground PAM server. In step 234, control resets the lease timer and continues with step 228. In step 228, control determines whether the public address pool 92 on the mobile platform is empty. If not, control continues with step 238. If the public address pool 92 is empty, the PAM client 96 on the mobile platform requests additional public addresses from the ground PAM server 28 in step 240 and control continues with step 238.

In step 238, control determines whether the client terminated the VPN session by closing the VPN module. If not, control continues with step 246. If the client terminated the VPN session, control returns the public address to the public address block and assigns the private address to the UCD 74 in step 248. In step 250, other services such as access to non-VPN web sites and multimedia services are enabled and control continues with step 246.

In step 246, control determines whether the public address block for the mobile platform is still needed. If not, control returns the public address block to the PAM server 28 in step 252 and control ends in step 254. If the public address block is still needed, control loops back to step 212. If multiple public address blocks are requested from the PAM server 28, the mobile platform can return one or more of the public address blocks or simply allow the lease to time out and end.

Figure 9:
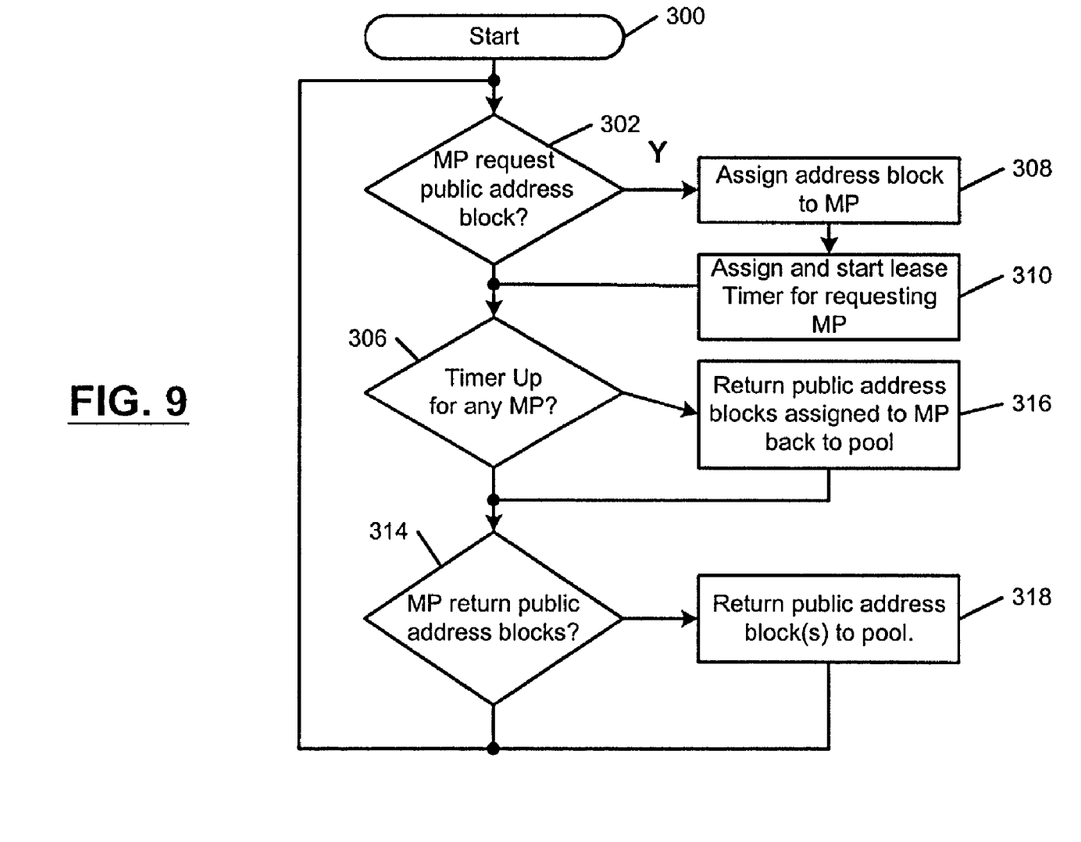
FIG. 9 illustrates steps employed by the public address manager to manage the public addresses.

Referring now to FIG. 9, steps performed by the ground PAM server 28 are shown. Control begins with step 300. In step 302, control determines whether a mobile platform is requesting a public address block. If not, control continues with step 306. If a mobile platform is requesting a public address block, the ground PAM server 28 assigns a public address block to the mobile platform in step 308. In step 310, a lease timer for the public address block that is requested by the mobile platform is started and continues with step 306. In step 306, control determines whether the lease timer of any address block of any mobile platform has timed out. If not, control continues with step 314. If the lease timer has timed out, the ground PAM server 28 returns the public address block to the public address pool (so that the public addresses can be effectively utilized by another mobile platform) in step 316. In step 314, control determines whether a mobile platform returned a public address block. If not, control loops to step 302. If the mobile platform returns the public access block, the ground PAM server 28 returns the public address block to the public address pool in step 318 and control continues with step 302.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A communications system for providing broadband access to passengers of mobile platforms, comprising:
    a router located on said mobile platform;
    a network connected to said router;
    user communication devices (UCDs) connected to said network, said UCDs establishing point-to-point over Ethernet (PPPoE) sessions with said router;
    a transmitter on said mobile platform, said transmitter being connected to said router;
    a receiver on said mobile platform, said receiver being connected to said router;
    a satellite in communication with said transmitter and said receiver of said mobile platform;
    a ground station in communication with said satellite;
    a distributed communications system connected to said ground station;
    a virtual private network (VPN) connected to said distributed communications system;
    a first address manager connected to said ground station, said first address manager leasing use of public Internet Protocol (IP) addresses by said mobile platform;
    said router including a second address manager communicating with said first address manager to lease said public IP addresses for said mobile platform.

2. The communications system of claim 1 wherein said distributed communications system is the Internet.

3. The communications system of claim 1, said second address manager assigning said public IP addresses when said UCDs request access to said VPN.

4. The communications system of claim 3, said second address manager assigning private IP addresses to said UCDs for at least one network service provided by said mobile platform.

5. The communications system of claim 1, said UCDs employing IPSec security protocol when communicating with said VPN.

6. A communications system for allowing passengers of mobile platforms to access virtual private networks (VPNs), comprising:
    a network on said mobile platform communicating with a ground station via a satellite, said ground station being connected to a virtual private network (VPN);
    user communication devices (UCDs) connected to said network; and
    a first address manager connected to said network, said first address manager being operable to enable public internet protocol (IP) addresses to be assigned when said UCDs request a connection to said VPN, said first address manager enabling assigning private IP addresses for at least one other network service, said first address manager assigning said public and private addresses without requiring said UCDs to reboot.

7. The communications system of claim 6 further comprising:
    a router connected to said UCDs and to enable said first address manager, said UCDs establishing point-to-point over Ethernet (PPPoE) sessions with said router.

8. The communications system of claim 6 further comprising:
    a second address manager, connected to said ground station and a distributed communications system, for enabling a leasing of use of said public IP addresses to said mobile platform.

9. A public address manager for a broadband communications system for mobile platforms, comprising:
    a network on said mobile platform that communicates with a ground station via a satellite;
    user communication devices (UCDs) connected to said network;
    a first address manager associated with said mobile platform that requests a public address block for said mobile platform; and
    a second public address manager associated with said ground station that leases said public address block to said first address manager.

10. The public address manager of claim 9, said first address manager enabling periodic transmission of a lease maintenance message to said second address manager.

11. The public address manager of claim 10, said second address manager including a lease timer, enabling termination of said lease if said lease timer expires before said lease maintenance message is received.

12. A method for operating a communications system that provides broadband access to passengers of mobile platforms, comprising:
    locating a router on said mobile platform;
    connecting a network to said router;
    connecting user communication devices (UCDs) to said network;
    establishing point-to-point over Ethernet (PPPoE) sessions between said UCDs and said router;

connecting a transmitter to said router;
connecting a receiver to said router;
communicating with a satellite and a ground station that is connected to a distributed communications system using said transmitter and said receiver of said mobile platform, said distributed communications system connecting to a virtual private network (VPN);
managing use of public address blocks using a first address manager; and
requesting said public address blocks using a second address manager associated with said mobile platform.

13. The method of claim 12 wherein said distributed communications system is the Internet.

14. The method of claim 12 further comprising:
assigning public IP addresses to said UCDs when said UCDs request access to said VPN.

15. The method of claim 14 further comprising:
assigning private IP addresses to said UCDs for a network service.

16. The method of claim 12 wherein said UCD employs IPSec security protocol when communicating with said VPN.

17. A method for allowing passengers of mobile platforms to access virtual private networks (VPNs), comprising:
providing a network on said mobile platform;
connecting user communication devices (UCDs) to said network;
providing a first address manager on said network that assigns public internet protocol (IP) addresses to said UCDs when said UCDs request access to said VPNs; and
using said first address manager to assign private IP addresses for a service provided by said network, said public and private addresses being assigned without requiring said UCDs to reboot.

18. The method of claim 17 further comprising:
connecting a router to said UCDs and to said first address manager; and
establishing point-to-point over Ethernet (PPPoE) sessions between said UCDs and said router.

19. The method of claim 18 further comprising:
connecting a second address manager (PAM) to a ground station; and
leasing use of said public IP addresses to said first address manager using said second address manager.

20. A communications system for providing broadband access to passengers of mobile platforms, comprising:
a router located on said mobile platform;
a network connected to said router;
user communication devices (UCDs) connected to said network;
a ground station in communication with said mobile platform; and
a first address manager connected to said ground station that leases use of public Internet Protocol (IP) addresses by said mobile platform, said router including a second address manager enabling communication with said first address manager to lease public IP addresses for said mobile platform.

21. The communications system of claim 20, wherein said UCDs are connected to said router by point-to-point over Ethernet (PPPoE) sessions.

22. The communications system of claim 20 further comprising:
a transmitter on said mobile platform that is connected to said router; and
a receiver on said mobile platform that is connected to said router.

23. The communications system of claim 20 further comprising:
a satellite in communication with said mobile platform; and
a distributed communications system connected to said ground station.

24. The communications system of claim 23, said distributed communications system comprising a wide area network.

25. The communications system of claim 23, further comprising:
a virtual private network (VPN) connected to said distributed communications system.

26. The communications system of claim 25, said second address manager enabling the assignment of said public IP addresses if said UCDs request access to said VPN.

27. The communications system of claim 26, said second address manager enabling assignment of private IP addresses to said UCDs for at least one network service provided by said mobile platform.

28. The communications system of claim 25, said UCDs comprising IPSec security protocol when communicating with said VPN.

* * * * *